United States Patent [19]

Nunn

[11] Patent Number: 4,619,135

[45] Date of Patent: Oct. 28, 1986

[54] APPARATUS AND METHOD FOR CALIBRATING ENVIRONMENT CONTROL SYSTEMS

[76] Inventor: Jack D. Nunn, 802 E. 28th St., Houston, Tex. 77009

[21] Appl. No.: 661,360

[22] Filed: Oct. 16, 1984

[51] Int. Cl.⁴ ............................................. G01L 27/00
[52] U.S. Cl. ....................................................... 73/4 R
[58] Field of Search ................... 73/1 R, 4 R, 168, 199

[56] References Cited

U.S. PATENT DOCUMENTS

| | | | |
|---|---|---|---|
| 2,490,821 | 12/1949 | Leonard | 73/4 R |
| 2,893,236 | 7/1959 | Coon et al. | 73/4 R |
| 3,365,131 | 1/1968 | Zoludow | |
| 3,587,290 | 6/1971 | Beauchamp | 73/1 R |
| 3,681,681 | 8/1972 | Auslander | 73/1 R |
| 4,227,645 | 10/1980 | de La Farge et al. | |
| 4,284,126 | 8/1981 | Dawson | |
| 4,298,165 | 11/1981 | McKinley | |
| 4,373,662 | 2/1983 | Bassett et al. | |

*Primary Examiner*—Jerry W. Myracle
*Attorney, Agent, or Firm*—Browning, Bushman, Zamecki & Anderson

[57] ABSTRACT

Calibration apparatus includes a fluid pressure system comprising a first gauge, a regulator and a second gauge in series. The calibration system is positioned in the general vicinity of one or more environment control system components to be calibrated, and the calibration fluid pressure system is connected in series in the control line between the thermostat, for example, and the components to be calibrated. The first gauge, toward the thermostat, monitors the fluid pressure provided in the control line from the thermostat and the second gauge, toward the components to be calibrated, monitors the fluid pressure provided to the components during the calibration process. The regulator may be adjusted to achieve selected pressures applied to the components which may then be adjusted to actuate at the desired pressures. The calibration apparatus may include an electrical detecting circuit for connecting to electric switches of such components to determine when said switches are open and closed so that actuation of the switches may be adjusted to occur at selected pressures applied to the components.

8 Claims, 2 Drawing Figures

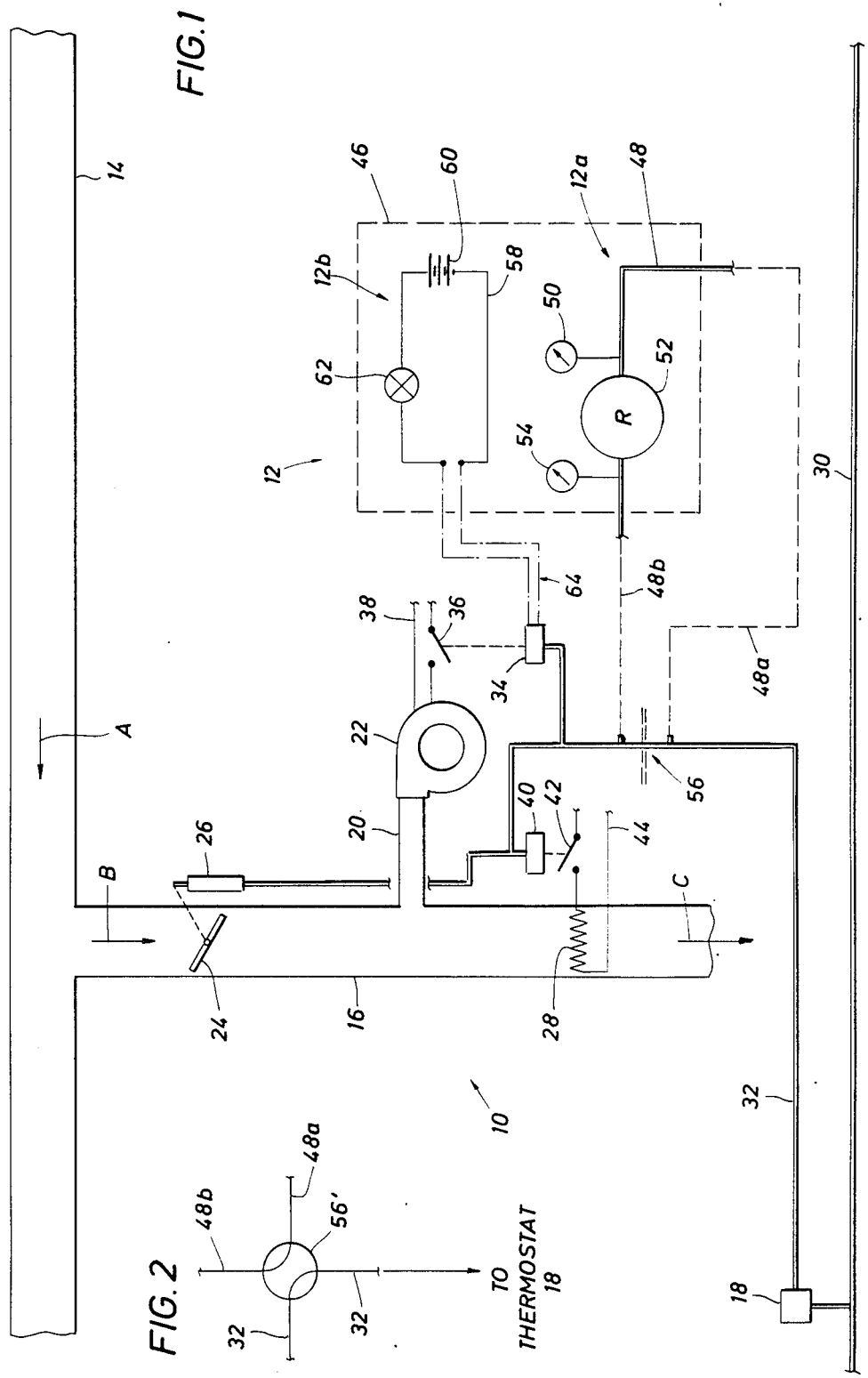

APPARATUS AND METHOD FOR CALIBRATING ENVIRONMENT CONTROL SYSTEMS

BACKGROUND OF THE INVENTION

1. Field of the Invention

The present invention pertains to apparatus and methods for use in calibrating systems operated, at least in part, by fluid pressure. More particularly, the present invention relates to techniques for calibrating environment control systems. As used herein, "environment control systems" is intended to include without limitation all types of systems for affecting the environment at a locale, such as systems which might variously be referred to as heating-ventilating-air conditioning (HVAC) systems, climate control systems, air supply systems, heating and/or cooling systems, temperature control systems, humidity control systems, etc., and is not limited to any particular type of system. Also as used herein, the term "calibrate" is used in the broad sense, to include without limitation the determination of operating conditions, the adjustment of operating conditions, the monitoring of operating conditions or the observation of current circumstances, and the like.

2. Description of Prior Art

Typical current environment control systems, such as for use in controlling the temperature in a structure, for example, include apparatus for circulating air relative to the locale and apparatus for providing heated air and/or cooled air to the locale. A thermostat is situated within the locale to monitor temperature and to serve as a control device for actuating components of the system which affect the rate of air supply, heat and cooling, for example. Such components are generally remote from the thermostat so that some means of communication between the thermostat and the components to be controlled by the thermostat must be provided. But the thermostat and the components controlled by the thermostat must be calibrated, the thermostat being calibrated to provide the necessary communication signals to the components at specific temperatures, and the components to actuate in response to specific communication signals.

A common mode of communication between the thermostat and other system components, particularly in larger structures, is by way of a fluid pressure system, and particularly a pneumatic system. A fluid pressure control line connects the thermostat with the components to be actuated. The thermostat serves as a regulator, and must be calibrated to provide to the control line from a fluid pressure source predetermined pressures corresponding to particular temperatures. The components to be actuated must be calibrated to respond to fluid pressure regulated by the thermostat to actuate at predetermined pressure and, therefore, predetermined temperatures.

Currently, it is known to calibrate such a fluid pressure control system by an operator first calibrating the thermostat, and then moving to the vicinity of the components to be calibrated. There, knowing the temperature of the thermostat, the operator observes the condition of the components to be calibrated, for example. The operator can return to the thermostat to change the regulator setting, then proceed again to the components to be actuated to observe their condition again. When the thermostat is at a setting at which actuation of a component is to occur, the operator may adjust the component to just be triggered, assuming that the temperature at the thermostat has remained constant while the operator has moved between locations. With several components to be calibrated for each thermostat, and particularly to actuate at different temperatures, calibration of such a system may be extremely time consuming, inconvenient and tedious.

It is desirable, and economically advantageous, to provide a technique for relatively rapid calibration of environment control systems whereby the operator may complete calibrations of the components to be actuated by the thermostat at the components without returning to the thermostat to alter its setting, for example. Thereafter, the thermostat may be calibrated without return to the calibrated components. Such a technique would preferably include the capability of so calibrating several components for actuation at different temperatures, and even calibrating individual components to change status at two or more temperatures for each such component, or to change continuously with temperature.

SUMMARY OF THE INVENTION

The present invention provides method and apparatus for calibrating equipment regulated by means of fluid pressure. Such equipment may be an environment control system operated by fluid pressure regulated by a thermostat or the like. The calibration system includes a fluid pressure system having a regulator and one or two gauges in series, the two gauges when included being positioned in line on opposite sides of the regulator. The calibration fluid pressure system is interposed in the control line between the thermostat and components to be calibrated so that the gauge on the thermostat side of the regulator, which is optional, monitors fluid pressure provided by the thermostat at the vicinity of the components to be calibrated. The second gauge positioned between the regulator and the components to be calibrated monitors the fluid pressure presented to the components during the calibration procedure. The regulator may be adjusted to apply selected fluid pressure to the various components so that the components can be adjusted to actuate as desired at selected pressures.

The calibration system may include an electrical calibration circuit, such as a detector circuit, for detecting the open or closed status of electrical switches. Such a detection circuit may include a power source in series with an indicator, such as a light source or meter, and connections to the switch to be monitored. Closure of the switch of the component, for example upon actuation in response to pre-selected fluid pressure being applied to the component, is indicated by actuation of the indicator, that is, for example the light source glowing.

A calibration system according to the present invention may be a separate unit from the environment control system, so that the calibration system may be applied to different environment control systems, or to different locations of the same system. As an alternative, a calibration system according to the present invention may be incorporated within an environment control system so that the calibration fluid pressure system connections and/or the calibration electrical circuitry connections may be relatively permanent.

In a method of the invention for calibrating an environment control system including a thermostat for controlling, by means of a fluid pressure control line, various components affecting the condition of the air at the thermostat, a calibration fluid pressure system is provided wherein a gauge and a regulator, and optionally an additional gauge, are positioned in line in the control line. The gauge, positioned relative to the regulator toward the components to be calibrated, monitors the fluid pressure applied to the components as the regulator is adjusted to selectively apply fluid pressure values to the components. The components are adjusted to actuate as desired at specified fluid pressure values applied thereto, as monitored by the basic gauge. The additional gauge, when provided, is located on the thermostat side of the regulator to monitor fluid pressure provided in the control line from the thermostat. An electrical switch detection circuit may also be provided, including a power source in series with an indicator and connections for positioning the detection circuit across a switch whose status is to be determined. The calibration circuit is connected so that the switch is in series with the power source and indicator. The regulator may be adjusted to apply selected fluid pressure to the component comprising the switch. The components can be adjusted to cause actuation of the switch at a specified fluid pressure value applied to the component, as indicated by the electrical detector circuit.

The present invention provides method and apparatus for efficiently, conveniently and more rapidly calibrating environment control systems than is otherwise available. The present invention is applicable for calibrating hydraulically-controlled equipment as well as pneumatically-controlled equipment. The invention is described hereinafter in relation to a pneumatically-controlled environment control system for purposes of illustration rather than limitation.

BRIEF DESCRIPTION OF THE DRAWING

FIG. 1 is a schematic illustration of a portion of an environment control system with a calibration system of the present invention shown connected thereto, the connections between the calibration system and the environment control system being shown in phantom; and FIG. 2 is a detail schematic illustration showing a fluid system valve for use in incorporating the calibration system into an environment control system.

DETAILED DESCRIPTION OF THE PREFERRED EMBODIMENT

A portion of an environment control system is shown in FIG. 1 generally at 10, and a calibration system according to the present invention is shown generally at 12. The environment control system 10 is described herein for purposes of illustration rather than limitation to facilitate disclosure of the present invention, the present invention being applicable to all types of such systems operated by fluid pressure. The system 10, which is of a type which may commonly be found in large buildings for the purpose of maintaining a desired temperature range of the air in the building, for example, may include an air conditioning unit (not shown) whose cooled air output is distributed throughout the building by means of main ducts, such as the duct 14, with branches, such as the duct 16, extending off of the main ducts and ultimately leading to outlet vents distributed throughout various zones of the building. Arrows A, B and C indicate air flow from the air conditioner (not shown) along a main duct 14, into a branch duct 16, and along the branch duct toward vents (not shown), respectively. A relatively large building is thus divided into zones with each zone serviced by one or more branch ducts 16 whereby the various zones of the building may each be independently environmentally controlled, at least in part.

Such a zone approach to controlling the environment of a large structure allows flexibility in controlling the environment, as well as the capability of addressing specific problem areas to maintain the environment throughout the building as desired relatively efficiently and at a minimum of cost. Thus, zones on the side of the building exposed to the sun during a particular time of day may be treated differently by the environment control system than zones not subject to excess heat from outside the building. The portion of the environment control system 10 illustrated in FIG. 1 may thus be considered, for example, to be dedicated to control of the environment in one such zone of a relatively large building. Similarly, for a smaller building, the entire structure may be considered a single zone, although multiple main ducts 14 and branch ducts 16 may nevertheless be employed for distribution of air.

The area of the structure to be controlled by the system 10 has its air temperature monitored by a thermostat 18 located to be exposed to the air whose temperature is to be maintained within a desired range. Various other components of the environment control system 10 may be distributed at strategic locations related, at least in part, to the duct system, for example. These components may vary depending on the needs of the structure whose environment is to be controlled. Typically, a duct 20 may connect the outlet of a fan 22 to a branch 16 to cause direct circulation of air from the locale whose environment is to be controlled back into the locale. For example, the intake for the fan 22 may be a return air system, comprising one or more ducts leading from that locale whose environment is to be controlled to the intake of the fan. In large buildings with false ceilings, the return to the intake of the fan may be by air gathered above the false ceiling, having passed through ports in the false ceiling for that purpose. The fan 22 forces return of the air back to the locale without the air having first been directly altered in temperature by the control system 10 prior to reaching the fan.

A damper 24 is positioned within the branch duct 16 at a location upstream from the junction of the duct 16 with the fan duct 20. The damper 24, which may comprise a baffle or valve member in the form of a plate pivotally mounted on a control rod or the like, may be adjusted in its orientation relative to the duct 16 between an open configuration in which the damper is aligned with the flow of air through the duct, presenting the least cross section to the flow front, and a closed position in which the damper extends perpendicularly across the duct to maximize its cross section with the air flow. With the damper 24 in the open configuration, maximum air flow may be distributed to the zone from the air conditioner; with the damper in the closed configuration, little or no air may be distributed to the zone from the air conditioner. To achieve an air flow volume rate from the air conditioner to the zone at a value between the maximum and minimum rates, the damper 24 is set at an intermediate position between full open configuration and closed configuration, the greater flow rates being achieved as the damper is moved from the closed configuration to the open configuration.

The damper 24 is linked to a damper motor 26 whose operation controls the orientation of the damper within the branch duct 16. The damper motor 26 is shown as a fluid pressure motor, which may be constructed generally as a piston-and-cylinder assembly that is spring-loaded to move the damper to either the open or closed configuration depending on the motor construction, with fluid pressure applied to the motor to an extent desired to oppose such movement to bring the damper to a desired configuration and to maintain the damper in that configuration. Operation of the fluid pressure motor 26 will be further discussed hereinafter.

A heater 28 is in line within the branch duct 16 downstream from the junction of that duct with the fan duct 20 so that, with the heater functioning to generate heat in the duct, air blown over the heater by the fan 22 will be heated before distribution to the zone. Both the fan 22 and the heater 28 are provided with electrical energy sources (not shown), and are controlled by the thermostat 18.

FIG. 1 illustrates a fluid pressure communication and control system whereby the thermostat 18 operates the various components such as the fan 22, the damper 24 and the heater 28. A fluid pressure supply line 30 extends from a compressor (not shown) or other fluid pressure source throughout the building in a multi-zone structure to the various thermostats 18 so that the high pressure side of each thermostat may be supplied with a constant value fluid pressure. Typically, the fluid, which is compressed air, is supplied to the thermostats 18 at 20 psi, for example.

A control line 32 for communicating fluid pressure extends from the thermostat 18 to various components to be controlled by the thermostat, such as the damper motor 26 and pressure/electric switches utilized to actuate the fan 22 and the heater 28. Although such devices are integral, the pressure/electric switches illustrated and discussed herein are considered in terms of their component parts or effective functions. In particular, a pressure/electric switch is indicated to include a pressure responsive switching mechanism 34 operationally connected to an electrical switch 36 connected in line along the lead lines 38 joining the fan 22 to its power source (not shown). Actuation of the pneumatic switching mechanism 34 closes the switch 36 to actuate the fan 22; release of the pneumatic switching mechanism 34 opens the electrical switch 36, turning off the fan.

Similarly, a pneumatically-responsive switching mechanism 40 is operatively connected to an electrical switch 42 in line along electrical lead lines 44 connecting the heater 28 to its power source (not shown). Again, operation of the switching mechanism 40 opens and closes the electrical switch 42 accordingly to selectively operate the heater 28.

As illustrated, the control line 32 from the thermostat 18 may branch out and connect all of the pneumatically operative components, including the switches 34 and 40 and the motor 26. Each of these control elements can be individually set, or calibrated, to operate at specific pneumatic pressures applied thereto by way of the control line 32. While the switching mechanisms 34 and 40 are generally either on or off, the damper motor 26 is an analog device which may assume any position between its extreme configurations corresponding to the damper 24 being fully opened or fully closed.

In the pneumatic control system, the thermostat 18 operates as a temperature-responsive regulator whereby, as the temperature at the thermostat varies, the thermostat pneumatic valve opens and closes accordingly to vary the pressure in the control line 32. The downstream components, including the damper motor 26 and the pressure switches 34 and 40, respond to the fluid pressure in the control line 32 to actuate at pressure values pre-selected by calibration of these components.

Generally, the pneumatic control of the components can be carried out in either a direct mode or a reverse mode. In the direct mode, as the temperature at the thermostat rises, the thermostat valve will tend to open wider so that the pressure in the control line 32 rises as the temperature rises. Correspondingly, the pressure switches 40 and 34 respond to open the respective electrical switches 42 and 36 as the pressure rises corresponding to higher temperatures to eventually shut down the heater 28 and the fan 22. The damper motor 26 gradually opens the damper as the pressure applied thereto rises as temperature at the thermostat rises.

In the reverse mode, the regulator of the thermostat 18 is made to operate oppositely to the operation in the direct mode, that is, as the temperature rises at the thermostat, the regulator tends to close, resulting in a decrease in pneumatic pressure in the control line 32. Accordingly, the spring loading of the damper motor 26, for example, is reversed so that the motor tends to open the damper 24 as the pressure in the control line 32 decreases corresponding to rising temperature at the thermostat 18. Similarly, the spring loading of the pressure switches 34 and 40 is reversed in each case compared to the configuration utilized for the direct mode of operation so that, as the temperature rises and the pressure in the control line decreases, at the respective pre-selected pressure values, the pressure switch 40 still operates to open the heater switch 42 and the pressure switch 34 operates to open the fan switch 36.

Regardless of the selected mode of operation of the pneumatic control by the thermostat 18, the environment control system 10 may be calibrated to operate with the same results. The calibration technique of the present invention is applicable to both modes of operation, but the direct mode is generally considered hereinafter for purposes of illustration rather than limitation.

Generally, at a temperature range below a first pre-selected value, the damper 24 will be completely closed, the fan 22 will be operating to circulate air into the branch duct 16, and the heater 28 will be operating to heat the circulating air before it is returned to the locale of the thermostat. As the temperature rises at the thermostat 18, the first pre-selected temperature value will be reached whereupon the heater switch 42 will be opened to cease operation of the heater 28, and will remain open for all higher temperatures. As the temperature continues to rise, the damper 24 will begin to open, again starting the opening process at a second, pre-selected temperature. The result, of course, of the damper 24 opening will be a mixture of cooled air from the air conditioner circulating along the main duct 14 and partially into the branch duct 16, with air recirculated from the thermostat locale by the fan 22 so that the temperature of the air downstream from the junction of the fan duct 20 with the branch duct 16 will achieve the desired temperature at the area of the thermostat 18. As the thermostat temperature reading continues to rise, eventually the fan switch 36 will open at a pre-selected third temperature to cease operation of the fan 22, and the damper 24 will be entirely opened so that all air driven through the branch duct 16 will have been cooled by the air conditioner. Falling temperatures generally result in a reverse process, with the fan 22 eventually operating at the third temperature, the damper 24 closing entirely at the second temperature, and the heater 28 actuating when the temperature drops to the first temperature.

The calibration system 12 may, for convenience, be constructed in a container, on a chassis, or the like, such structure being indicated at 46. The calibration system 12 includes a fluid pressure system shown generally at 12a. The fluid pressure system 12a includes a fluid pressure line 48 along which are connected in series a first fluid pressure gauge 50, a regulator 52, and a second fluid pressure gauge 54, with the first gauge 50 toward a first end 48a of the fluid pressure line 48, and the second gauge 54 on the side of the regulator toward the second end 48b of the fluid pressure line.

The fluid pressure system 12a is operated in line along the control line 32 between the thermostat 18 and the components to be calibrated, preferably at a location conveniently close to the components so that an operator would have the capability of adjusting the components while being able to observe the gauges 50 and 54 and manipulate the regulator 52. Such a location for the calibration fluid pressure system 12a may be expected to be relatively remote from the thermostat 18. To place the calibration fluid pressure system 12a in line, the control line 32, which is generally a flexible tube, may be cut, such as indicated at 56, and the two new control line ends connected to the system line ends 48a and 48b, with the result that the first gauge 50 is in series between the thermostat 18 and the regulator 52, and the second gauge 54 is in line between the regulator 52 and the components to be calibrated such as the pressure switches 34 and 40 and the damper motor 26.

Another version of the present invention includes incorporating the calibration system 12 into the environment control system 10. In such case, rather than a cut in the control line 32 at 56, a valve 56' is provided as illustrated in FIG. 2. With such arrangement, an operator may selectively operate the valve 56' between two configurations, including an operating configuration in which the control line 32 is closed and the calibration line ends 48a and 48b are disconnected from the control line as shown, and a calibration mode in which the valve is rotated 90° counterclockwise to interrupt the control line 32 and close the connections between the calibration line end 48a and the control line 32 toward the thermostat 18, and between the calibration line end 48b and the control line 32 toward the components to be calibrated.

The calibration system 12 may also include an electrical calibration system 12b including an open circuit loop 58 with a power source 60 and an indicator 62 connected in series along the loop. The indicator 62 may be a meter or a lamp, for example, which glows when the loop 58 is closed. To calibrate the pressure/electric switches, the main power supply line (not shown) to the installation including the fan 22 and the heater 28, for example, may be open. To calibrate the pressure/electric switches, the main power supply line (not shown) to the installation including the fan 22 and the heater 28, for example, may be opened. The calibration loop 58 may then be selectively connected to the switch terminals of a pressure/electric switch combination by leads indicated generally at 64, for example. As noted hereinbefore, a pressure/electric switch as indicated by the pressure switch mechanism 34 and the electrical switch 36, for example, is provided as a single component. The connections of the leads 64 would, in practice, be made to the two terminals of the switch 36, for example, to calibrate the fan switch operation. Similarly, to calibrate the heater switch operation, the calibration loop 58 may be connected across the terminals of the electrical switch 42 at the pressure/electric switch depicted here by the combination of the pressure switch mechanism 40 and the electrical switch 42. Closure of the pressure/electric switch so connected to the calibration loop 58 closes the calibration loop, actuating the indicator 62. In this way, all pressure/electric switches may be calibrated safely and conveniently.

In another version of the present invention, wherein the calibration system 12 is incorporated in the environment control system 10, appropriate switches may be provided to selectively connect a calibration loop 58 across a pressure/electric switch to be calibrated. For example, each of the pressure/electric switches may be selectively connected in an operation mode whereby actuation of the pressure/electric switch opens or closes the electric power circuit to the respective component, such as the fan 22 or the heater 28, and wherein the calibration circuit line 58 is always open, or in a calibration mode in which the connection with the component electric power supply line is always open, and the calibration circuit 58 is so connected that actuation of the pressure/electric switch opens or closes, accordingly, the calibration circuit 58. Thus, a separate calibration loop 58 may be provided for each such pressure/electric switch that is included in the environment control system 10, for example, or one such calibration circuit 58 may be selectively connected, by switch adjustment, to any of the pressure/electric switches in the calibration mode. Further, the environment control system 10 may include a combination of separate calibration circuits such as 58 for calibrating one pressure/electric switch each, and one or more calibration circuits wherein each such circuit is selectively switchable among two or more pressure/electric switches for purposes of calibration. Other such combinations and/or other techniques for incorporating calibration electric detector circuits into an environment control system may be suggested by the present disclosure. Generally, the discussion hereinafter concerning steps in calibrating an environment control system 12 using the present invention is provided in terms of a separate calibration system but the calibration method applies also to integral systems.

To calibrate the environment control system 10, the calibration pressure system 12a is connected in line along the control line 32. Where the control line 32 is cut at 56 for this purpose, such a connection to the calibration pressure line ends 48a and 48b may be readily made in a well known manner by use of a metal tubular connector (not shown) commercially available for that purpose. One end of the connector is inserted into an open end of the control line 32, which fits sufficiently tightly about the connector to provide a seal thereto. The other end of the connector is similarly fitted inside an open end of the calibration supply line 48. The first gauge 50 will register the pressure in the control line 32 toward the thermostat 18. The fluid pressure allowed by the regulator of the thermostat 18 may be first read, and the pressure at the first gauge compared to the reading at the thermostat to check for leaks or blockages in the control line 32. The second gauge 54 will register the pressure permitted by the regulator 52 to be applied to the components to be calibrated.

The environment control system components may be tested before further calibration is carried out. The pressure regulator 52 may be adjusted to lower the pressure to the components to be calibrated, and then subsequently adjusted to slowly increase the pressure, while the operator monitors the second pressure gauge 54 and observes the various devices, including the pressure/electric switches and the damper motor 26 to determine if each component is functioning properly to actuate at the pressure at which it is set to actuate. If the pneumatic control system is operating in reverse mode, the components may be tested by lowering the pressure applied thereto through the working pressure range.

Since the various pressure regulated components must be coordinated in their operations, the pressure/electric switches, which are to be triggered on or off at specific pressure settings, can be calibrated according to the calibration of the damper motor 26, which functions over a wide range of temperatures. The damper motor 26 may be adjusted to operate over an extended range of pressures in the control line 32 by the operator varying the pressure to the motor by means of the regulator 52, while monitoring the pressure by means of the second gauge 54, and adjusting the spring load of the motor until the damper 24 is operated by the motor in relation to the pressures applied to the motor as desired. For example, the damper motor 26 may be calibrated at the pressure at which the damper 24 is to be started to close and/or at the pressure at which complete damper closure is to be just achieved.

The main electric power line that supplies power to the fan 22 and to the heater 28, for example, may be disconnected, and the calibration detector circuit 12b connected across the pressure/electric switch 34/36. The regulator 52 may be adjusted to cause the damper motor 26 to position the damper 24 at the orientation thereof at which the fan 22 is to cease operation, and the pressure switch mechanism 34 adjusted to open the electrical switch 36 as pressure applied to the switch mechanism 34 rises to reach the value which places the damper at the orientation of fan cut-off. This can be done and tested by lowering the pressure to the switch mechanism 34 a slight amount (which closes the calibration circuit 58 by closure of the switch 34 to light the indicator 62), adjusting the switch mechanism just short of cut-off of the switch 36, then raising the pressure applied to the switch mechanism by operation of the regulator 52 while monitoring the gauge 54 to ensure achievement of the desired pressure value for fan cut-off. When the switch mechanism 34 actuates in response to the pressure to open the electrical switch 36, the calibration circuit 58 will be opened, and the indicator 62 will cease functioning, that is, the light 62 will go out. The pressure gauge 54 should indicate that the switch mechanism 34 has opened the calibration circuit 58, as indicated by the light 62 going out, at the selected pressure at which the fan 22 is to be turned off. If necessary, the switch mechanism 34 may be repeatedly adjusted and tested as described until it operates to open the switch 36 and, therefore, the calibration circuit 58 at the desired pressure as indicated by the gauge 54.

The calibration circuit 58 may be similarly connected to the switch mechanism 40, and the pressure to the switch mechanism 40 lowered by operation of the regulator 52 to a value at which the heater electrical switch 42 is to be operated. The same procedure may then be followed as described above in connection with the operation of the fan 22. The pressure at which the heater switch 42 is to be opened may be achieved by operation of the regulator 52 with monitoring of the gauge 54, and the pressure switch mechanism 40 adjusted to open the heater switch 44 and, therefore, the calibration loop 58, as indicated by the light 62 going out, as the pressure is increased to the actuating pressure desired.

The calibration circuit 58 may be disconnected, and the calibration pressure line 48 disconnected from the control line 32 and the integrity of the control line restored. One of the same tubular connectors used to connect an end of the control line 32 with an end of the calibration pressure line 48 may be used to reconnect the two ends of the control line 32 at 56, where the line may be opened again if the environment control system 10 is to be re-calibrated. The power line may also be closed.

With the pressure-regulated components calibrated, the thermostat 18 may be calibrated to provide the appropriate pressures to actuate the various components when the temperature at the thermostat reaches various specified values. The operator knows the individual pressures at which the fan 22 and heater 28 are switched on and off, and, for example, for various positions of the damper 24. For example, if it is desired to maintain a 72° F. temperature in the vicinity of the thermostat 18, the thermostat may be calibrated so that its regulator will provide a pressure to the control line 32 which maintains the heater 28 turned off, the fan 22 turned on and the damper 24 closed, or nearly so, at 72° F. Then a few degrees rise in temperature at the thermostat 18 with the corresponding increase in control line pressure would increase the opening at the damper 24 to provide cooled air and, as the pressure continues to rise, the damper would eventually open completely and the fan 22 cut off. Similarly, as the temperature drops from 72° F., the damper 24 achieves complete closure if not already at that point and, as the temperature continues to drop, the heater 28 is actuated to provide warm air to the locale of the thermostat.

The present invention thus provides a convenient and efficient technique for calibrating environment control systems, eliminating the practice followed generally without the present invention of repeatedly monitoring and adjusting the thermostat of such a system as observations of the operation of the regulated components and adjustments thereof are made with the accompanying movement over considerable distances between the thermostat and such components.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. Apparatus for calibrating environment control equipment comprising:
   a. a fluid pressure system, including a fluid pressure line having a first end and a second end opposite thereto, and connected in series along said fluid pressure line a first gauge toward said first end, a regulator and a second gauge toward said second end; and
   b. detector circuit means for detecting the opening and closing of electrical switches as part of said control equipment, including a power source, indicator means, and means for connecting said circuit, in series, with such an electrical switch whose condition is to be determined;

c. wherein said first and second ends of said fluid pressure system may be interposed in a fluid pressure control line as part of said environment control equipment so that said first and second gauges and said regulator are connected in series with said control line, and said means for connecting said detector circuit means may be connected across a switch whose condition is to be determined, whereupon said first gauge may determine the fluid pressure provided in the control line of the environment control equipment, and the regulator may be selectively adjusted to provide fluid pressure to one or more environment control equipment components to be regulated by fluid pressure in said control line and including said switch so that selected pressure may be so applied to such components and their configurations appropriately adjusted to cause such components to operate in response to selected pressures applied thereto along said control line.

2. An environment control system comprising:
a. means for circulating and controlling the temperature of air to affect the environment of a locale, including means, responsive to fluid pressure applied thereto, for controlling the flow of air, and means, responsive to fluid pressure applied thereto, for varying the temperature of air;
b. thermostat means for monitoring the temperature of the environment of said locale and including fluid pressure regulator means responsive to temperature-sensitive means of said thermostat means;
c. fluid pressure means, including means for providing fluid pressure to said thermostat regulator means, control line means for connecting said thermostat regulator means with said means for varying the temperature of air and with said means for controlling the flow of air such that said thermostat regulator means controls the distribution of fluid pressure along said control line means to said means for varying the temperature of air and means for controlling the flow of air in response to the temperature of said environment as determined by said thermostat temperature-sensitive means; and
d. calibration means, including a first gauge, a regulator and a second gauge for connecting in series along said control line means with said first gauge toward said thermostat, and between said thermostat and one or more of said means for controlling the flow of air and means for varying the temperature of air; and
e. wherein, with said first gauge, said regulator and said second gauge so connected in series along said control line means, said first gauge may determine the fluid pressure provided in said control line means from said thermostat, said regulator may be selectively adjusted to apply selected pressure to such means for controlling the flow of air or said means for varying the temperature of air and their configurations appropriately adjusted to cause such means to operate in response to selected pressures applied thereto along said control line.

3. An environment control system as defined in claim 2 wherein said calibration means further comprises detector circuit means for detecting the opening and closing of electrical switches included in said means for circulating and controlling the temperature of air, including a power source, indicator means, and means for connecting said circuit means, in series, with an electrical switch whose condition is to be determined.

4. A method of calibrating an environment control system, including a thermostat for regulating fluid pressure, responsive to temperature, in a control line for applying the fluid pressure to system components for varying the condition of air supplied thereby, comprising the following steps:
a. providing a fluid pressure system including a pressure gauge and a regulator in series along the control line with the regulator toward the thermostat;
b. with the gauge, monitoring fluid pressure applied to one or more components to be calibrated from the regulator in the control line, and selectively adjusting the regulator to provide selected fluid pressure; and
c. adjusting such component, if necessary, to effect actuation of said component upon application of a selected pressure in the control line at said component.

5. A method as defined in claim 4 further comprising the following steps:
a. providing an electrical detector circuit including a power source in series with an indicator for placing in series with a component switch; and
b. adjusting the component, if necessary, to cause actuation of the switch at a selected fluid pressure applied to the component, as detected by the detector circuit.

6. A method as defined in claim 4 wherein the step of providing the fluid pressure system in series along the control line is effected, at least in part, by opening the control line at a point toward one or more components to be calibrated and connecting the fluid pressure system to the control line opening to place the fluid pressure system in line with the control line.

7. A method as defined in claim 4 wherein said fluid pressure system includes an additional gauge positioned between the regulator and the thermostat when the fluid pressure system is so provided in series along the control line, whereby the fluid pressure provided in the control line from the thermostat is monitored.

8. A method as defined in claim 4 further comprising the additional steps of connecting a gauge to monitor the fluid pressure provided from the thermostat to the control line and adjusting the thermostat, if necessary, so that the thermostat will provide a selected fluid pressure to the control line at a selected temperature determination by the thermostat.

* * * * *